(12) United States Patent
Newman et al.

(10) Patent No.: US 11,625,688 B2
(45) Date of Patent: Apr. 11, 2023

(54) FORECASTING MODEL GENERATION FOR SAMPLE BIASED DATA SET

(71) Applicant: ADP, Inc., Roseland, NJ (US)

(72) Inventors: Kurt Newman, Columbus, GA (US); Ramsay Cole, Brooklyn, NY (US)

(73) Assignee: ADP, INC., Roseland, NJ (US)

( * ) Notice: Subject to any disclaimer, the term of this patent is extended or adjusted under 35 U.S.C. 154(b) by 3 days.

(21) Appl. No.: 16/855,414

(22) Filed: Apr. 22, 2020

(65) Prior Publication Data

US 2021/0334759 A1   Oct. 28, 2021

(51) Int. Cl.
| | |
|---|---|
| *G06Q 10/10* | (2012.01) |
| *G06N 5/04* | (2006.01) |
| *G06Q 40/00* | (2012.01) |
| *G06Q 10/04* | (2012.01) |
| *G06Q 10/1053* | (2023.01) |
| *G06Q 40/12* | (2023.01) |

(52) U.S. Cl.
CPC .......... *G06Q 10/1053* (2013.01); *G06N 5/04* (2013.01); *G06Q 10/04* (2013.01); *G06Q 40/125* (2013.12)

(58) Field of Classification Search
None
See application file for complete search history.

(56) References Cited

U.S. PATENT DOCUMENTS 7,941,351 B1 *  5/2011  Rosenfeld .............. G06Q 20/10
                                          705/30
8,620,706 B1 * 12/2013  Prakken ................ G06Q 10/105
                                          705/7.11
2003/0004925 A1 *  1/2003  Knoblock ............... G06Q 10/06
2012/0109700 A1 *  5/2012  Cook ................ G06Q 10/06311
                                          705/7.13
2013/0262174 A1 * 10/2013  Singh ..................... G06Q 10/06
                                          705/7.25

(Continued)

FOREIGN PATENT DOCUMENTS

| EP | 1459210 A1 * | 9/2004 | ............. G06Q 10/06 |
| WO | WO-03046771 A1 * | 6/2003 | ............. G06Q 10/06 |
| WO | WO-2004074987 A2 * | 9/2004 | ........... G06Q 10/063 |

OTHER PUBLICATIONS

Masum, Abdul Kadar Muhammad, et al. "Intelligent human resource information system (i-HRIS): a holistic decision support framework for HR excellence." Int. Arab J. Inf. Technol. 15.1 (2018): 121-130. (Year: 2018).*

(Continued)

*Primary Examiner* — Thomas L Mansfield
(74) *Attorney, Agent, or Firm* — Foley & Lardner LLP

(57) ABSTRACT

A method, apparatus, system, and computer program product for creating a forecasting model for payroll records. Payroll records are received for a group of employers. The payroll records comprise granular data parameters about employees of the group of employers. A forecasting model is created that aligns the payroll records to high-level employment data. Creating the forecasting model includes identifying predictor variables from the granular data parameters of the payroll records. Creating the forecasting model includes generating a set of basis functions from the predictor variables. Creating the forecasting model includes combining the set of basis functions to create the forecasting model.

21 Claims, 5 Drawing Sheets

(56) References Cited

U.S. PATENT DOCUMENTS

2014/0257900 A1* 9/2014 Jacobs .......... G06Q 10/063116
  705/7.16
2017/0091861 A1* 3/2017 Bianchi ................ G06Q 40/025

OTHER PUBLICATIONS

Hollenbeck, Kevin. "A review of retirement income policy models." (1995). (Year: 1995).*

Bidder, Rhys. "Are wages useful in forecasting price inflation?." FRBSF economic letter 33 (2015): 1-5. (Year: 2015).*

Yamaguchi, Kazuo. "Accelerated failure-time regression models with a regression model of surviving fraction: an application to the analysis of "permanent employment" in Japan." Journal of the American Statistical Association 87.418 (1992): 284-292. (Year: 1992).*

* cited by examiner

FORECASTING MODEL GENERATION FOR SAMPLE BIASED DATA SET

BACKGROUND

1. Field

The disclosure relates generally to an improved computer system and, more specifically, to a method, apparatus, system, and computer program product for creating forecasting model that take into account sampling bias in a data set.

2. Description of the Related Art

Forecasting is a process of making predictions of the future based on past and present data. Forecasting has many applications in business, and can aid in making decisions such as allocating funds for employee compensation. A forecast that is marginally more accurate can give a business the edge to maximize profitability, while also attracting and retaining talented employees.

In the area of human resource management, an organization may want to forecast employment data to facilitate evaluation and comparison of wage patterns within and between different companies, industry sectors, and geographical regions. Examples of forecasted employment data include average, median, and percentiles of annual base salary, hourly wage rates, etc.

Forecasting is typically performed using aggregated data. However, depending on the sample sources and sample sizes, aggregation raises several potential difficulties. A common disadvantage of aggregated data is a small number of records in a group that can lead to wrong inferences. Furthermore, contextual anomalies can cause data outliers to become normal by adding more dimensions to the data, thereby affecting the reliability of the benchmarks. This can be exacerbated by missing dimension values and client base bias.

SUMMARY

According to one embodiment of the present invention, a method creating a forecasting model from a sampling-biased data set. Payroll records for a group of employers are received by a computer system. The payroll records comprise granular data parameters about employees of the group of employers. A forecasting model is created that aligns the payroll records to high-level employment data. Creating the forecasting model includes: identifying predictor variables from the granular data parameters of the payroll records; generating a set of basis functions from the predictor variables; and combining the set of basis functions to create the forecasting model.

According to another embodiment of the present invention, a forecasting modeling system comprising a computer system that operates to receive payroll records for a group of employers. The payroll records comprise granular data parameters about employees of the group of employers. The computer system creates the forecasting model that aligns the payroll records to high-level employment data. In creating the forecasting model, the computer system further operates to: identify predictor variables from the granular data parameters of the payroll records; generate a set of basis functions from the predictor variables; and combine the set of basis functions to create the forecasting model.

According to yet another embodiment of the present invention, a computer program product for creating a forecasting model from a sampling-biased data set comprises a computer-readable-storage media and program code stored on the computer-readable storage media. The program code includes program code for receiving payroll records for a group of employers. The payroll records comprise granular data parameters about employees of the group of employers. The program code includes program code for creating the forecasting model that aligns the payroll records to high-level employment data. The program code for creating the forecasting model comprises: code for identifying predictor variables from the granular data parameters of the payroll records; code for generating a set of basis functions from the predictor variables; and code for combining the set of basis functions to create the forecasting model.

DETAILED DESCRIPTION

The illustrative embodiments recognize and take into account one or more different considerations. For example, the illustrative embodiments recognize and take into account that sampling-bias in payroll records in a group can create unreliable inferences when predicting employment data. The illustrative embodiments further recognize and take into account that contextual anomalies in aggregated data can allow data outliers to become normal by the addition of dimensions. Ignoring the sampling-bias in payroll records when creating forecasting model can result in forecasting model that are less accurate than desired.

Therefore, it would be desirable to have a method, apparatus, system, and computer program product that take into account at least some of the issues discussed above, as well as other possible issues. For example, it would be desirable to have a method and apparatus that overcome an issue with creating a forecasting model from a sampling-biased data set to accurately predict employment data at a higher level of granularity.

Thus, illustrative embodiments provide a method, apparatus, system, and computer program product that create a forecasting model from a sampling-biased data set. In one illustrative example, payroll records are received for a group of employers. The payroll records comprise granular data parameters about employees of the group of employers. A forecasting model is created the that aligns the payroll records to high-level employment data. Creating the forecasting model includes identifying predictor variables from the granular data parameters of the payroll records. Creating the forecasting model includes generating a set of basis functions from the predictor variables. Creating the forecasting model includes combining the set of basis functions to create the forecasting model.

According to an illustrative example, the forecasting model is used to predict employment data. Using the forecasting model enables predictions at a higher level of granularity than reported in the high-level employment data.

According to an illustrative example, payroll records are classified into of a plurality of cells at an industry level and a size level. A time series is generated time series from the payroll records for each of these cells. Each time series is then seasonally adjusted, and outliers are removed.

According to an illustrative example, the time series within each of the plurality of cells is adjusted to match the distributions of industry and employer size reported in the high-level employment data. high-level employment data is interpolated to determine weight values at the industry level. The weight values are extrapolated at the size level based on the time series of a corresponding one of the plurality of cells. A weighted average of the seasonally-adjusted time series is computed within each industry based on the extrapolated weight values. Th cells are aggregated, and the forecasting model is generated therefrom.

Figure 1:
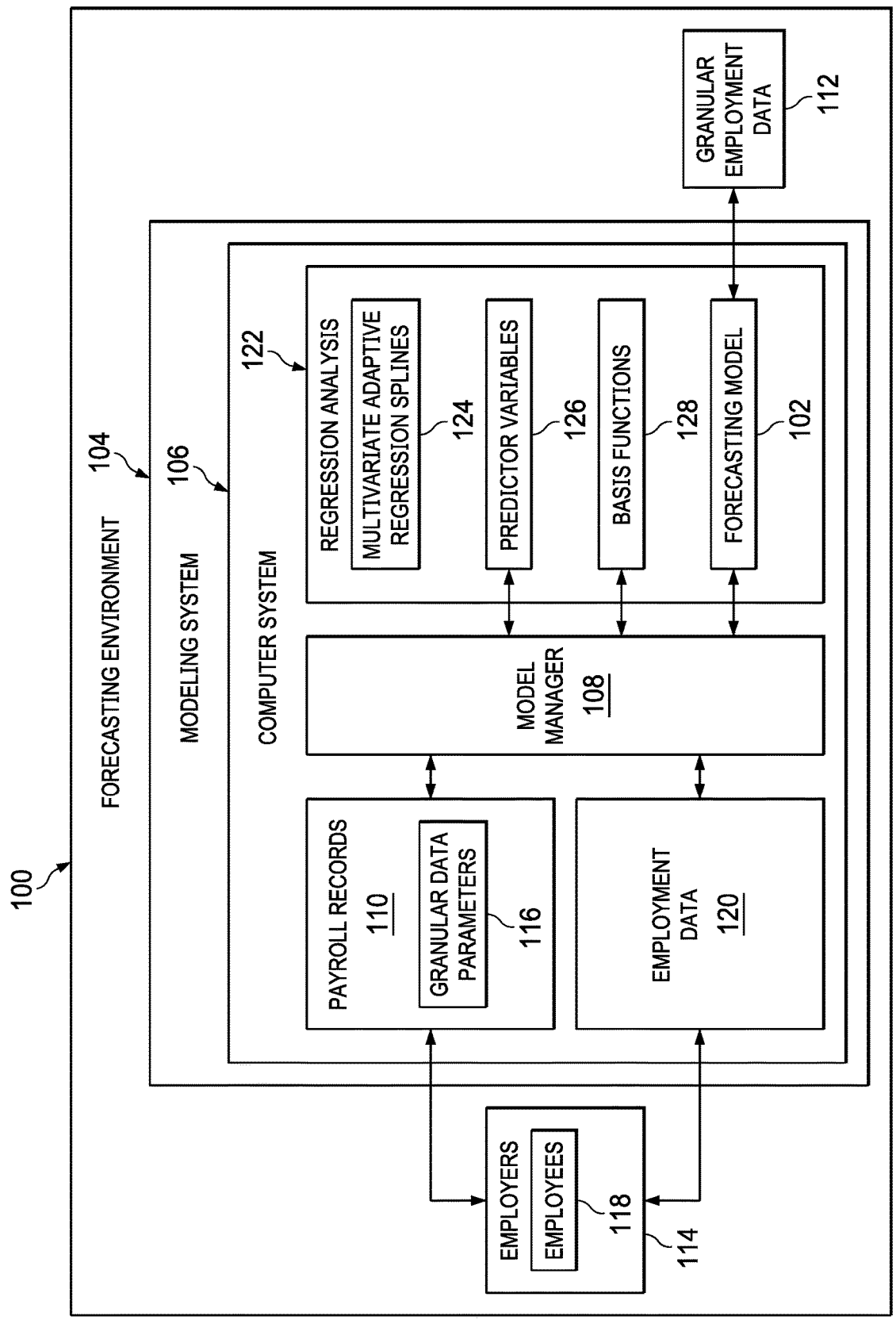
FIG. 1 is a block diagram of a forecasting environment in accordance with an illustrative embodiment.

With reference now to the figures and, in particular, with reference to FIG. 1, a block diagram of a forecasting environment is depicted in accordance with an illustrative embodiment. In this illustrative example, forecasting environment 100 is an environment in which forecasting model 102 can be used to make predictions such as employment forecasting. In this illustrative example, modeling system 104 operates to create forecasting model 102.

As depicted, modeling system 104 comprises computer system 106 and model manager 108. Model manager 108 is located in computer system 106.

Model manager 108 can be implemented in software, hardware, firmware, or a combination thereof. When software is used, the operations performed by model manager 108 can be implemented in program code configured to run on hardware, such as a processor unit. When firmware is used, the operations performed by model manager 108 can be implemented in program code and data and stored in persistent memory to run on a processor unit. When hardware is employed, the hardware may include circuits that operate to perform the operations in model manager 108.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, a "set of," a "group of," or a "number of," when used with reference to items, means one or more items. For example, a "set of items" is one or more items. Likewise, a "group of items" or a "number of items" is one or more items. For example, "a number of different types of networks" is one or more different types of networks.

Computer system 106 is a physical hardware system and includes one or more data processing systems. When more than one data processing system is present in computer system 106, those data processing systems are in communication with each other using a communications medium. The communications medium can be a network. The data processing systems can be selected from at least one of a computer, a server computer, a tablet computer, or some other suitable data processing system.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, model manager 108 in computer system 106 operates as a forecasting model system to create forecasting model 102 from payroll records 110. Forecasting model 102 can be used to predict granular employment data 112.

As depicted, model manager 108 can operate to receive payroll records 110 for a group of employers 114. In the illustrative example, payroll records 110 comprise granular data parameters 116 about employees 118 of the group of employers 114.

Payroll records 110 are data generated in performing payroll operations for employers 114. payroll records 110 may include various data parameters about employees 118. Data records that are specific to individual employees are more highly granular than generalized observations about a company or industry.

As used herein, "granular" data is detailed data, or the lowest level that data can be in a target set. It refers to the size that data fields are divided into, in short how detail-oriented a single field is. As the data becomes more subdivided and specific, it is also considered more granular.

Granular data parameters 116 are data parameters used to calculate payroll for employees 118. Granular data parameters 116 can include parameters about employees 118 such as, for example, gross pay, net pay, withholdings, benefits, employee name, employee identification or social security number, and employee address, as well as other suitable parameters. Granular data parameters 116 can include parameters about employers 114 such as, for example, company name, company identifies or tax payer identification, company address, and company logo, as well as other suitable parameters.

In the illustrative example, model manager 108 can create forecasting model 102 from payroll records 110. Using payroll records 110 to create forecasting model 102 enables predictions of employment data at a higher level of granularity.

In the illustrative example, forecasting model 102 comprises a regression analysis 122 that employs multivariate adaptive regression splines 124. Multivariate adaptive regression splines 125 is a non-parametric regression technique that models nonlinearities and interactions between variables.

When model manager 108 uses multivariate adaptive regression splines 124 to create forecasting model 102, forecasting model 102 takes the form of:

$$f(x) = \sum_{i=1}^{k} c_i B_i(x)$$

wherein: $c_i$ is a constant coefficient; and
$B_i(x)$ is a basis function.

Each basis function $B_i(x)$ is an element of a particular basis for the function space k. Each basis function $B_i(x)$ is either a constant, a hinge function, or a product of two or more hinge functions.

A hinge function takes the form:

max(0,x−c)

or max(0,c−x)

Hinge functions partition the data into disjoint regions, each of which can be treated independently. Two or more hinge functions can be multiplied together to form a basis function that is non-linear.

Starting with just the intercept term, i.e., the mean of the response values, basis functions are repeatedly added in mirrored-pairs to the model. At each step, the mirrored-pair of basis functions is selected to produce a maximum reduction in sum-of-squares residual error. Model manager 108 continues adding terms until the change in residual error is too small to continue or until a maximum number of terms is reached.

Individual basis functions are then removed one-by-one from the model, until an optimal submodel is determined. the performance of model subsets, i.e., a model that excludes a basis function, are compared using generalized cross validation (GCV) to in order to identify which basis function should be removed. Generalized cross-validation uses a formula to approximate the error that would be determined by leave-one-out validation. the formula penalizes model complexity to avoid model overfit.

In this illustrative example, creating forecasting model 102 includes identifying predictor variables 126 from the granular data parameters 116 of the payroll records 110.

Predictor variables 126 are independent variables (x) used by model manager 108 to create forecasting model 102. Each of predictor variables 126 corresponds to one of granular data parameters 116. To create forecasting model 102, model manager 108 identifies predictor variables 126 that best predict high-level employment data 120. In other words, instead of determining f(x) from payroll records 110, model manager 108 sets f(x) based on high-level employment data 120, and then identifies ones of granular data parameters 116 that that best predict high-level employment data 120.

High-level employment data 120 comprise statistics about employment. high-level employment data 120 is reported at a lower level of granularity than payroll records 110. For example, high-level employment data 120 can include statistics about employment reported at an industry level.

High-level employment data 120 can be generated by an entity different than an entity that provides payroll records 110. In one specific example, high-level employment data 120 comprises the Current Employment Statistics produced by the Bureau of Labor and Statistics (BLS).

The Bureau of Labor and Statistics (BLS) Current Employment Statistics (CES) program, also known as the payroll survey or the establishment survey, is a monthly survey of approximately 145,000 businesses and government agencies representing approximately 697,000 worksites throughout the United States. From the sample, CES produces and publishes employment, hours, and earnings estimates for the nation, states, and metropolitan areas at detailed industry levels.

In the illustrative example, creating the forecasting model 102 comprises a regression analysis using multivariate adaptive regression splines. Creating forecasting model 102 includes generating a set of basis functions 128 from the predictor variables 126. creating forecasting model 102 includes combining the set of basis functions 128 to create forecasting model 102. In the illustrative example, the identifying, generating, and combining steps are performed using multivariate adaptive regression splines.

Using the forecasting model 102 generated from payroll records 110 enables model manager 108 to predict employment data at a higher level of granularity than reported in the high-level employment data 120. In this manner, model manager 108 in computer system 106 provides a practical application for creating forecasting model 102 such that the functioning of computer system 106 is improved in forecasting granular employment data 112.

In one illustrative example, one or more solutions are present that overcome an issue with creating forecasting model 102 that predict employment data at a higher level of granularity. In other words, these forecasting model 102 include aligning the payroll records to high-level employment data. As a result, one or more solutions may provide an effect of enabling the creation of forecasting model 102 that have increased accuracy in predicting employment data at a higher level of granularity as compared to current techniques for creating forecasting models to forecast employment data.

Computer system 106 can be configured to perform at least one of the steps, operations, or actions described in the different illustrative examples using software, hardware, firmware, or a combination thereof. As a result, computer system 106 operates as a special purpose computer system in which model manager 108 in computer system 106 enables creating forecasting model 102 that predict employment data at a higher level of granularity as compared to currently used techniques. In particular, model manager 108 transforms computer system 106 into a special purpose computer system as compared to currently available general computer systems that do not have model manager 108.

In the illustrative example, the use of model manager 108 in computer system 106 integrates processes into a practical application for creating forecasting model 102 that increases the performance of computer system 106. In other words, model manager 108 in computer system 106 is directed to a practical application of processes integrated into model manager 108 in computer system 106 that creates forecasting model 102 from payroll records 110 that predicts employment data at a higher level of granularity. In other words, computer system 106 or some other computer system has increased accuracy in predicting employment data at a higher level of granularity when using forecasting model 102 as created by model manager 108.

In this illustrative example, model manager 108 in computer system 106 enables creating forecasting model 102 with increased accuracy as compared to forecasting models created by currently used techniques. In this illustrative example, model manager 108 receives payroll records for a group of employers. The payroll records comprise granular data parameters about employees of the group of employers. In this illustrative example, model manager 108 creates forecasting model 102 that aligns the payroll records to high-level employment data. Creating the forecasting model 102 includes identifying predictor variables from the granular data parameters of the payroll records. Creating the forecasting model 102 also includes generating a set of basis functions from the predictor variables. Additionally, creating the forecasting model 102 includes combining the set of basis functions to create the forecasting model 102.

Figure 2:
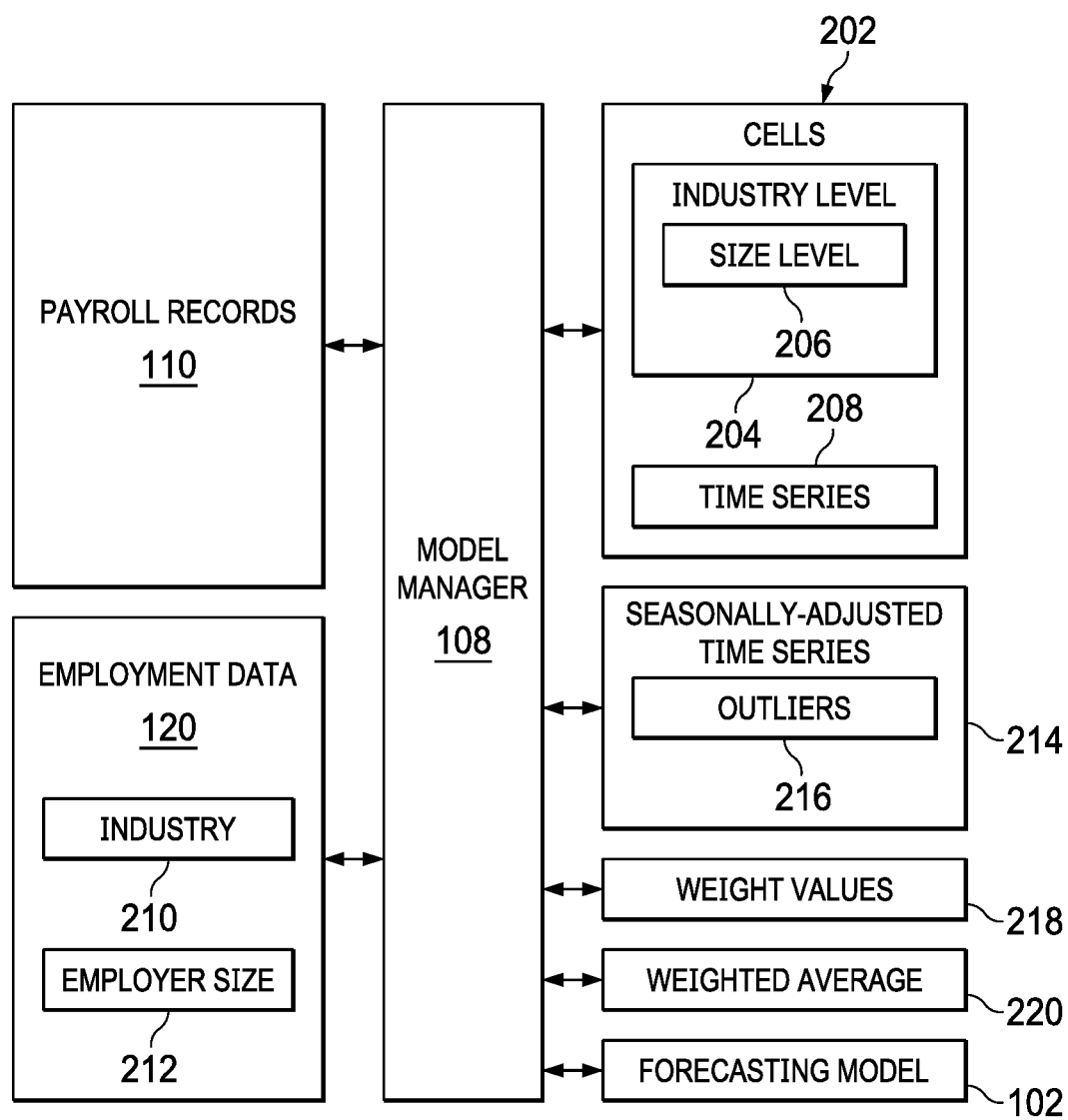
FIG. 2 is a block diagram illustrating aligning the payroll records to high-level employment data in accordance with an illustrative embodiment.

Turning now to FIG. 2, a block diagram illustrating aligning the payroll records to high-level employment data is depicted in accordance with an illustrative embodiment. The data flow illustrated in this figure can be used to create a forecasting model that aligns the payroll records to high-level employment data in FIG. 1.

As depicted, model manager 108 can operate to classifying the payroll records 110 into of a plurality of cells 202 at an industry level 204 and a size level 206. model manager 108 then aligns the plurality of cells 202 to distributions of industry 210 and employer size 212 reported in the high-level employment data 120. By breaking data into different categories, model manager 108 can provides a more compelling, in depth look at employment at a higher level of granularity.

In one illustrative example, model manager 108 can operate to classifying payroll records 110 at an industry level 204 based on the North American Industrial Classification system (NAICS)

In one illustrative example, model manager 108 assigns each payroll records 110 to cells 202 at industry level 204 according to the North American Industrial Classification System used by the BLS. Alternatively, model manager 108 assigns each payroll records 110 to cells 202 at industry level 204 according using the Standard Industrial Classification, or use a NAICS-SIC mapping to reclassify those payroll records 110.

In one illustrative example, model manager 108 classifies payroll records 110 of employers 114 into the 13 NAICS private industry sectors: (1) natural resources and mining, (2) construction, (3) manufacturing, (4) trade, transportation and utilities, (5) information, (6) financial activities, (7) professional, scientific and technical services, (8) management of companies and enterprises, (9) administrative and support services, (10) education, (11) healthcare, (12) leisure and hospitality, and (13) other services.

Model manager 108 can operate to classifying payroll records 110 at a size level 206 based on employer size 212. The companies commonly classified at industry level 204 are then sub-grouped into cells 202 according to their employer size 212. Cells 202 at size level 206 can include one or more different cells based on the number of employees employed by the Employer. For example, size level 206 can include cells 202 for an employer size of 1-19 employees, 20-49 employees, 50-499 employees, 500-999 employees, and 1,000 or more employees, well as other suitable sizes.

In one illustrative example, payroll records 110 are aggregated up to the "parent" company based on a common Federal Employer Identification Number (EIN). Such aggregates are then classified by the size of parent company rather than the size of the individual establishment. For example, the aggregation of all of a company's different locations may now appear in a larger business category, rather than as many "small" or "medium" businesses.

If a company includes divisions or subsidiaries from more than one industry, each unit is allocated to the appropriate industry at industry level 204. However, the company size to which the unit is allocated is the company size of the combined control keys. For example, if a company is made up of two units, each with 15 employees in two industries, the company is allocated to company size 20-49, but the number of employees allocated in this company size to each industry is still 15.

In one illustrative example, model manager 108 can generate a time series 208 from the payroll records 110 within each of the plurality of cells 202. time series 208 can be an employment growth for each of the plurality of cells 202.

In this illustrative example, model manager 108 can creates matched pairs of establishments that have reported payroll records 110 in two consecutive months. Each month's data include only the matched pairs available in that month. Matched pairs are aggregated and matched-pair growth rates of employment are computed into the different cells 202.

The CES measures the number of people on payrolls during the pay period that includes the 12th of the month (the reference period). A pay period can be any length of time; the most common pay frequency is weekly. But a pay period can also cover two weeks; it can be bimonthly, monthly, etc. If payroll records 110 provide pay dates rather than pay periods, matched pairs are constructed using interpolation.

If there is no recorded employment for the pay period that includes the 12th, but a record exists for either a later or earlier pay period during the month, Model manager 108 can estimate employment for the reference period by linearly interpolating between the level of employment on the prior record and the record for the later pay period. The maximum time range for linear interpolation to capture missing employment on the 12th can depend on the payment frequency of an establishment.

After calculating time series 208 at each industry level 204 by size level 206, model manager 108 can operate to seasonally adjusting the time series 208. In one illustrative example, model manager 108 applies an autoregressive integrated moving average (ARIMA) and seasonal adjustment decomposition (SEATS) to seasonally adjusting the time series 208. Deseasonalized trends can then be recalculated at industry level 204 with each new month of data.

In this illustrative example, model manager 108 can removing outliers 216 from the seasonally-adjusted time series 214. For example, for each payroll records 110 commonly classified at industry level 204, model manager 108 compares the record with the trend value. Model manager 108 identifies and removes outliers from payroll records 110 using the same autoregressive integrated moving average (ARIMA) and seasonal adjustment decomposition (SEATS). Model manager 108 can then recalculate time series 208 at size level 206 using the cleaned data.

As depicted, model manager 108 can operate to adjusting the time series within each of the plurality of cells to match the distributions of industry and employer size reported in the high-level employment data. For example, time series 208 at industry level 204 can be are computed by taking a weighted average within each industry level 204 of time series 208 at size level 206.

In this illustrative example, adjusting the time series within each of the plurality of cells includes interpolating the high-level employment data to determine weight values 218 at the industry level. The weight values are extrapolated at the size level based on the time series of a corresponding one of the plurality of cells. a weighted average 220 of the seasonally-adjusted time series is then computed within each industry level 204 based on the extrapolated weight values.

This method allows different trends of employment by size of payroll within industries, while assuming that the other industry-wide relationships implied by the regressions hold for all size classes within an industry. The monthly industry distribution of company cells and the forecasted industry employment growth are then combined to produce the forecasted employment growth for company cells in the NER The illustration of forecasting environment 100 in FIG. 1 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, forecasting model 102 can operate to create one or more forecasting model in addition to or in place of forecasting model 102.

Figure 3:
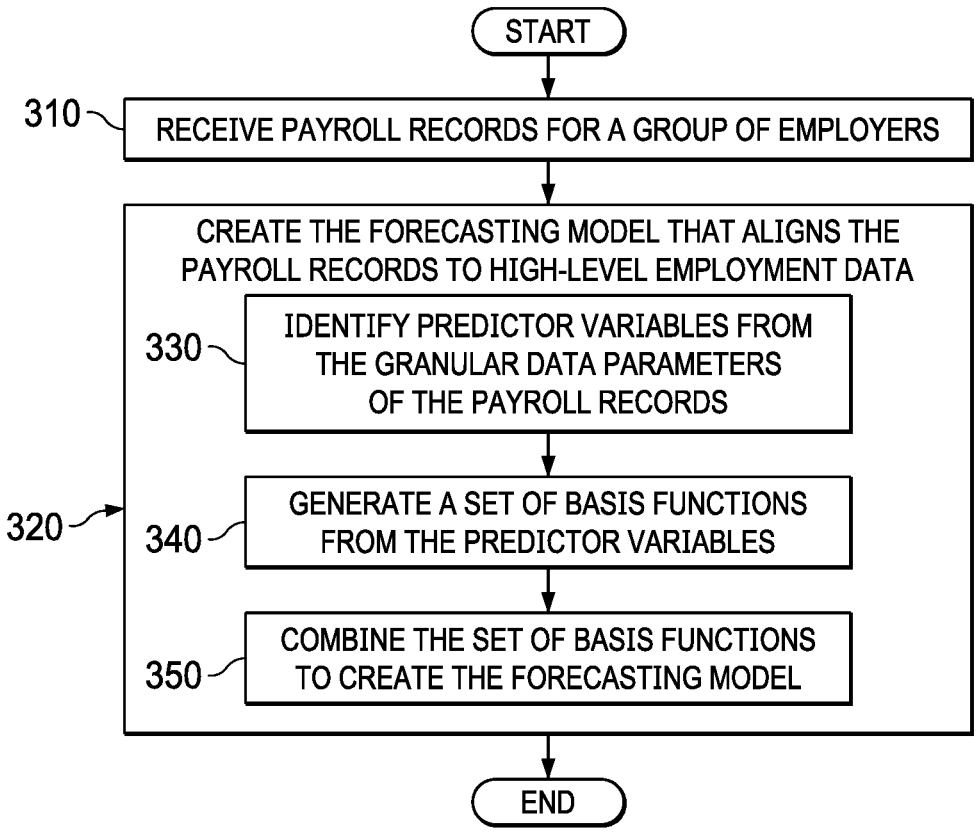
FIG. 3 is a flowchart of a process for creating a forecasting model from a sampling-biased data set in accordance with an illustrative embodiment.

Turning next to FIG. 3, a flowchart of a process for creating a forecasting model from a sampling-biased data set is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in model manager 108 in computer system 106 in FIG. 1.

The process begins by receiving payroll records for a group of employers (step 310). The payroll records comprise granular data parameters about employees of the group of employers.

The process creates the forecasting model that aligns the payroll records to high-level employment data, (step 320). As depicted, creating the forecasting model comprises identifying predictor variables from the granular data parameters of the payroll records (step 330), generating a set of basis functions from the predictor variables (step 340), and combining the set of basis functions to create the forecasting model (step 350). The process terminates thereafter.

Figure 4:
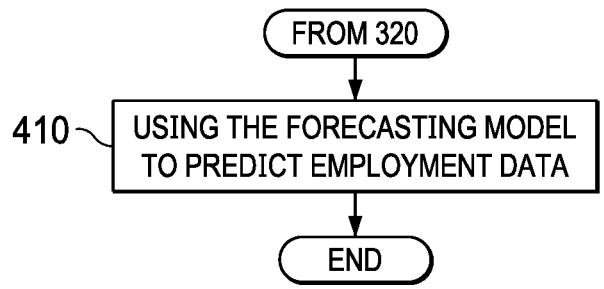
FIG. 4 is a flowchart of a process for aligning the payroll records to high-level employment data in accordance with an illustrative embodiment.

With reference next to FIG. 4, a flowchart of a process for predicting employment data is depicted in accordance with an illustrative embodiment. The process in FIG. 4 is an example of one manner in which the process of FIG. 3 can be implemented.

Continuing from step 320 of FIG. 3, the process using the forecasting model to predict employment data (step 410). The process terminates thereafter. Using the forecasting model generated by the process of FIG. 3 enables the prediction of employment data at a higher level of granularity.

Figure 5:
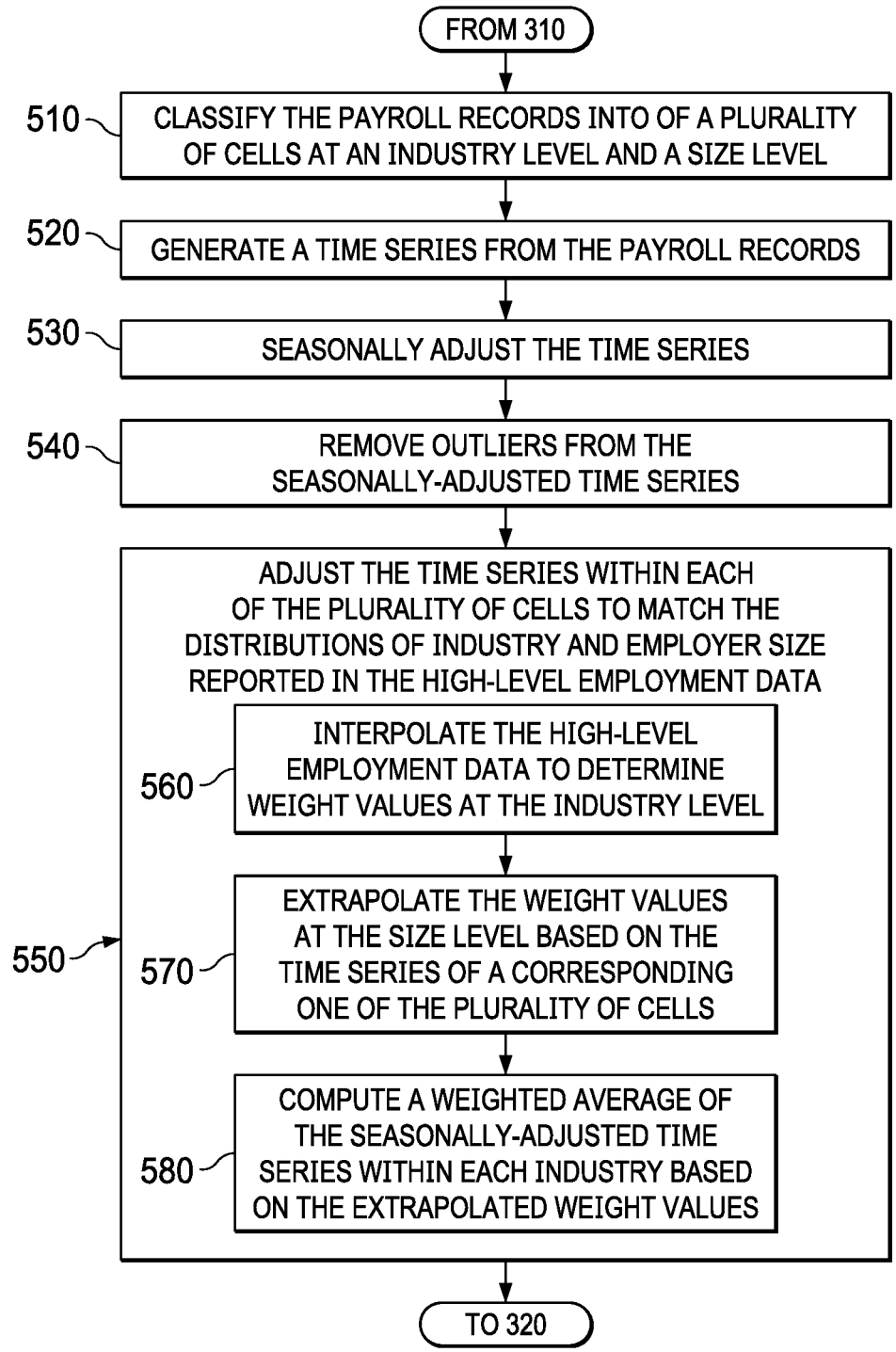
FIG. 5 is a flowchart of a process for aligning the payroll records to high-level employment data in accordance with an illustrative embodiment.

Turning now to FIG. 5, a flowchart of a process for forecasting model that aligns the payroll records to high-level employment data is depicted in accordance with an illustrative embodiment. The flowchart in FIG. 5 illustrate additional processing steps that can be used to create a forecasting model that aligns the payroll records to high-level employment data.

Continuing from step 310 of FIG. 3, the process classifies the payroll records into of a plurality of cells at an industry level and a size level (step 510). The process generates a time series from the payroll records within each of the plurality of cells (step 520). In this manner, the forecasting model aligns the plurality of cells to distributions of industry and employer size reported in the high-level employment data.

The process seasonally adjusts the time series (step 530). The process removes outliers from the seasonally-adjusted time series (step 540). The seasonal adjustment and outlier removal can be are performed using an autoregressive integrated moving average (ARIMA) and seasonal adjustment decomposition (SEATS) of the time series.

The process adjusts the time series within each of the plurality of cells to match the distributions of industry an employer size reported in the high-level employment data (step 550). According to an illustrative example, adjusting the time series comprises interpolating the high level employment data to determine weight values at the industry level (step 560), extrapolating the weight values at the size level based on the time series of a corresponding one of the plurality of cells (step 570), and computing a weighted average of the seasonally adjusted time series within each industry based on the extrapolated weight values (step 580). Thereafter, the process continues to step 320 of FIG. 3, where the forecasting model is built from the cleaned time series.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 6:
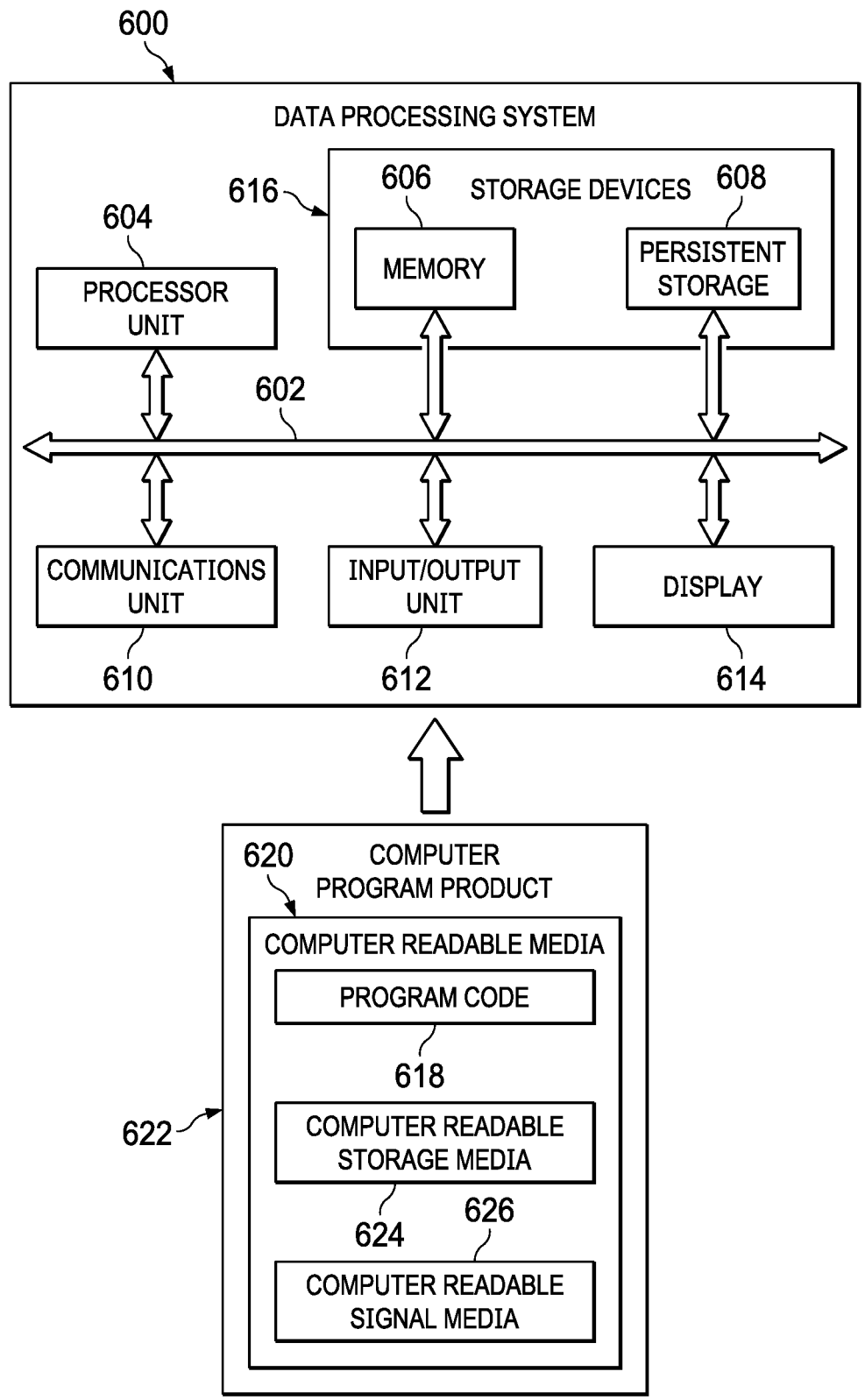
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement one or more data processing systems in computer system 106. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 604 can may be implemented using one or more heterogeneous processor systems in which a main processor is present with secondary processors on a single chip. As another illustrative example, processor unit 604 can be a symmetric multiprocessor system containing multiple processors of the same type on a single chip.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program code, computer usable program code, or computer-readable program code that can be read and executed by a processor in processor unit 604. The program code in the different embodiments can be embodied on different physical or computer-readable storage media, such as memory 606 or persistent storage 608.

Program code 618 is located in a functional form on computer-readable media 620 that is selectively removable and can be loaded onto or transferred to data processing system 600 for execution by processor unit 604. Program code 618 and computer-readable media 620 form computer program granular employment data 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 can be transferred to data processing system 600 using a computer-readable signal media. The computer-readable signal media can be, for example, a propagated data signal containing program code 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 620" can be singular or plural. For example, program code 618 can be located in computer-readable media 620 in the form of a single storage device or system. In another example, program code 618 can be located in computer-readable media 620 that is distributed in multiple data processing systems. In other words, some instructions in program code 618 can be located in one data processing system while other instructions in in program code 618 can be located in one data processing system. For example, a portion of program code 618 can be located in computer-readable media 620 in a server computer while another portion of program code 618 can be located in computer-readable media 620 located in a set of client computers.

The different components illustrated for data processing system 600 are not meant to provide architectural limitations to the manner in which different embodiments can be implemented. In some illustrative examples, one or more of the components may be incorporated in or otherwise form a portion of, another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program code 618.

Thus, illustrative embodiments provide a method, apparatus, system, and computer program product that create a forecasting model from a sampling-biased data set. In one illustrative example, payroll records are received for a group of employers. The payroll records comprise granular data parameters about employees of the group of employers. A forecasting model is created the that aligns the payroll records to high-level employment data. Creating the forecasting model includes identifying predictor variables from the granular data parameters of the payroll records. Creating the forecasting model includes generating a set of basis functions from the predictor variables. Creating the forecasting model includes combining the set of basis functions to create the forecasting model.

One or more illustrative examples overcome a problem with creating forecasting model that predict employment data at a higher level of granularity. In other words, these forecasting model include aligning the payroll records to high-level employment data. As a result, one or more of the illustrative examples may enable the creation of forecasting model that have increased accuracy in predicting employment data at a higher level of granularity as compared to current techniques for creating forecasting model to forecast employment data.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for creating a forecasting model from a sampling-biased data set, the method comprising:
receiving, by a computer system, payroll records for a group of employers, wherein the payroll records comprise granular data parameters about employees of the group of employers; and
creating, by the computer system, the forecasting model that aligns the granular data parameters of the payroll records to high-level employment data, wherein creating the forecasting model comprises a non-parametric regression analysis technique that models nonlinearities and interactions between variables using multivariate adaptive regression splines to perform the steps of:
identifying, by the computer system, predictor variables from the granular data parameters of the payroll records comprising records selected from gross pay, net pay, withholdings, benefits, and combinations thereof;
generating, by the computer system, a set of basis functions from the predictor variables; and
combining, by the computer system, the set of basis functions to create the forecasting model that forecasts the high-level employment data from the granular data parameters of the payroll records.

2. The method of claim 1, wherein creating the forecasting model, takes a form of:

$$f(x) = \sum_{i=1}^{k} c_i B_i(x)$$

wherein:
$c_i$ is a constant coefficient; and
$B_i(x)$ is a basis function selected from a constant, a hinge function, and a product of two or more hinge functions.

3. The method of claim 2, further comprising:
using, by the computer system, the forecasting model to predict employment data at a higher level of granularity than reported in the high-level employment data that comprises statistics about employment, hours, and earnings estimates for geographic areas at detailed industry levels.

4. The method of claim 2, further comprising:
classifying, by the computer system, the payroll records into of a plurality of cells at an industry level and a size level; and
within each of the plurality of cells, generating a time series from the payroll records;
wherein the forecasting model aligns the plurality of cells to distributions of industry and employer size reported in the high-level employment data.

5. The method of claim 4, further comprising:
seasonally adjusting, by the computer system, the time series; and
removing, by the computer system, outliers from the seasonally-adjusted time series.

6. The method of claim 5, wherein the seasonally adjusting and removing outlier steps are performed using an autoregressive integrated moving average (ARIMA) and seasonal adjustment decomposition (SEATS) of the time series.

7. The method of claim 5, further comprising:
adjusting, by the computer system, the time series within each of the plurality of cells to match the distributions of industry and employer size reported in the high-level employment data, including:
interpolating the high-level employment data to determine weight values at the industry level;
extrapolating the weight values at the size level based on the time series of a corresponding one of the plurality of cells; and
computing a weighted average of the seasonally-adjusted time series within each industry based on the extrapolated weight values.

8. A computer system comprising:
a model manager that operates to:
receive payroll records for a group of employers, wherein the payroll records comprise granular data parameters about employees of the group of employers; and
create a forecasting model that aligns the granular data parameters of the payroll records to high-level employment data, wherein creating the forecasting model comprises a non-parametric regression analysis technique that models nonlinearities and interaction between variables using multivariate adaptive regression splines, the computer system further operates to:
identify predictor variables from the granular data parameters of the payroll records comprising records selected from gross pay, net pay, withholdings, benefits, and combinations thereof;
generate a set of basis functions from the predictor variables; and combine the set of basis functions to create the forecasting model that forecasts the high-level employment data from the granular data parameters of the payroll records.

9. The computer system of claim 8, wherein creating the forecasting model, takes a form of:

$$f(x) = \sum_{i=1}^{k} c_i B_i(x)$$

wherein:
 $c_i$ is a constant coefficient; and
 $B_i(x)$ is a basis function selected from a constant, a hinge function, and a product of two or more hinge functions.

10. The computer system of claim 9, wherein the computer system further operates to:
 using the forecasting model to predict employment data at a higher level of granularity than reported in the high-level employment data that comprises statistics about employment, hours, and earnings estimates for geographic areas at detailed industry levels.

11. The computer system of claim 9, wherein the computer system further operates to:
 classify the payroll records into of a plurality of cells at an industry level and a size level; and
 within each of the plurality of cells, generate a time series from the payroll records;
wherein the forecasting model aligns the plurality of cells to distributions of industry and employer size reported in the high-level employment data.

12. The computer system of claim 11, wherein the computer system further operates to:
 seasonally adjust the time series; and
 remove outliers from the seasonally-adjusted time series.

13. The computer system of claim 12, wherein the seasonally adjusting and removing outlier steps are performed using an autoregressive integrated moving average (ARIMA) and seasonal adjustment decomposition (SEATS) of the time series.

14. The computer system of claim 12, wherein the computer system further operates to:
 adjust the time series within each of the plurality of cells to match the distributions of industry and employer size reported in the high-level employment data, including:
 interpolating the high-level employment data to determine weight values at the industry level;
 extrapolating the weight values at the size level based on the time series of a corresponding one of the plurality of cells; and
 computing a weighted average of the seasonally-adjusted time series within each industry based on the extrapolated weight values.

15. A computer program product for creating a forecasting model from a sampling-biased data set, the computer program product comprising:
 a non-transitory computer-readable storage media;
 program code, stored on the non-transitory computer-readable storage media, for receiving payroll records for a group of employers, wherein the payroll records comprise granular data parameters about employees of the group of employers; and
 program code, stored on the non-transitory computer-readable storage media, for creating the forecasting model that aligns the granular data parameters of the payroll records to high-level employment data, wherein the program code for creating the forecasting model comprises a non-parametric regression analysis technique that models nonlinearities and interactions between variables using multivariate adaptive regression splines including:
 program code for identifying predictor variables from the granular data parameters of the payroll records comprising records selected from gross pay, net pay, withholdings, benefits, and combinations thereof;
 program code for generating a set of basis functions from the predictor variables; and
 program code for combining the set of basis functions to create the forecasting model that forecasts the high-level employment data from the granular data parameters of the payroll records.

16. The computer program product of claim 15, wherein the program code for creating the forecasting model, takes a form of:

$$f(x) = \sum_{i=1}^{k} c_i B_i(x)$$

wherein:
 $c_i$ is a constant coefficient; and
 $B_i(x)$ is a basis function selected from a constant, a hinge function, and a product of two or more hinge function.

17. The computer program product of claim 16, further comprising:
 program code, stored on the non-transitory computer-readable storage media, for using the forecasting model to predict employment data at a higher level of granularity than reported in the high-level employment data that comprises statistics about employment, hours, and earnings estimates for geographic areas at detailed industry levels.

18. The computer program product of claim 16, further comprising:
 program code, stored on the non-transitory computer-readable storage media, for classifying the payroll records into of a plurality of cells at an industry level and a size level; and
 program code, stored on the non-transitory computer-readable storage media, for generating, within each of the plurality of cells, a time series from the payroll records;
wherein the forecasting model aligns the plurality of cells to distributions of industry and employer size reported in the high-level employment data.

19. The computer program product of claim 18, further comprising:
 program code, stored on the non-transitory computer-readable storage media, for seasonally adjusting the time series; and
 program code, stored on the non-transitory computer-readable storage media, for removing outliers from the seasonally-adjusted time series.

20. The computer program product of claim 19, where in the seasonally adjusting and removing outlier steps are performed using an autoregressive integrated moving average (ARIMA) and seasonal adjustment decomposition (SEATS) of the time series.

21. The computer program product of claim 19, further comprising:
 program code, stored on the non-transitory computer-readable storage media, for adjusting the time series within each of the plurality of cells to match the distributions of industry and employer size reported in the high-level employment data, including:
  program code for interpolating the high-level employment data to determine weight values at the industry level;
  program code for extrapolating the weight values at the size level based on the time series of a corresponding one of the plurality of cells; and
program code for computing a weighted average of the seasonally-adjusted time series within each industry based on the extrapolated weight values.

* * * * *